(12) United States Patent
Cvijetic et al.

(10) Patent No.: US 10,761,014 B2
(45) Date of Patent: Sep. 1, 2020

(54) METHOD AND APPARATUS FOR REMOTE SENSING USING OPTICAL ORBITAL ANGULAR MOMENTUM (OAM)-BASED SPECTROSCOPY FOR OBJECT RECOGNITION

(71) Applicant: NEC Laboratories America, Inc., Princeton, NJ (US)

(72) Inventors: Neda Cvijetic, San Jose, CA (US); Giovanni Milione, Franklin Square, NY (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 84 days.

(21) Appl. No.: 14/931,568

(22) Filed: Nov. 3, 2015

(65) Prior Publication Data

US 2016/0123877 A1 May 5, 2016

Related U.S. Application Data

(60) Provisional application No. 62/074,778, filed on Nov. 4, 2014.

(51) Int. Cl.
*G01N 21/17* (2006.01)
*G01S 7/48* (2006.01)
*G01S 7/481* (2006.01)
*G01S 17/89* (2020.01)

(52) U.S. Cl.
CPC .............. *G01N 21/17* (2013.01); *G01S 7/481* (2013.01); *G01S 7/4802* (2013.01); *G01S 17/89* (2013.01); *G01N 2021/1793* (2013.01)

(58) Field of Classification Search
CPC .......... G01N 2021/1793; G01N 21/21; G01N 21/27; G01N 21/55; G01N 2201/08; G01S 17/89; G01S 7/4802; G01S 7/4814
See application file for complete search history.

(56) References Cited

U.S. PATENT DOCUMENTS

| 7,701,381 | B2 * | 4/2010 | Schmitt | G01S 7/024 340/572.2 |
|---|---|---|---|---|
| 9,733,108 | B2 * | 8/2017 | Cvijetic | G01D 5/34 |
| 10,238,298 | B2 * | 3/2019 | Wang | A61B 5/0095 |
| 2005/0036677 | A1 * | 2/2005 | Ladjevardi | G01N 21/84 382/162 |
| 2005/0190144 | A1 * | 9/2005 | Kong | G06F 3/0338 345/156 |

(Continued)

OTHER PUBLICATIONS

Néstor Uribe-Patarroyo, Andrew Fraine, David S. Simon, Olga Minaeva, and Alexander V. Sergienko Phys. Rev. Lett. 110, 043601, Jan. 2013 (Year: 2013).*

(Continued)

*Primary Examiner* — Violeta A Prieto
(74) *Attorney, Agent, or Firm* — Joseph Kolodka

(57) ABSTRACT

A method and system for remote sensing using optical orbital angular momentum (OAM)-based spectroscopy for object recognition. The method includes applying an OAM state on a light beam to generate an optical OAM spectrum, transmitting the light beam on a remote object, receiving a reflected optical OAM spectrum associated with the remote object, and providing a high resolution image of the remote object based on the reflected optical OAM spectrum.

16 Claims, 5 Drawing Sheets

(56) References Cited

U.S. PATENT DOCUMENTS

| | | | | |
|---|---|---|---|---|
| 2006/0132447 | A1* | 6/2006 | Conrad | G06F 3/0219 345/168 |
| 2008/0121790 | A1* | 5/2008 | Grier | G02B 21/32 250/251 |
| 2008/0133366 | A1* | 6/2008 | Evans | G06Q 30/02 705/14.26 |
| 2008/0247669 | A1* | 10/2008 | Chen | G06T 3/00 382/294 |
| 2009/0225433 | A1* | 9/2009 | Tocci | G01J 3/02 359/629 |
| 2009/0287990 | A1* | 11/2009 | Lynton | G06F 16/4393 715/209 |
| 2010/0013696 | A1* | 1/2010 | Schmitt | G01S 7/024 342/54 |
| 2010/0030592 | A1* | 2/2010 | Evans | G06K 7/1095 705/5 |
| 2010/0327866 | A1* | 12/2010 | Albu | G01N 24/08 324/304 |
| 2012/0033094 | A1* | 2/2012 | Ishii | G02B 27/646 348/208.6 |
| 2012/0126810 | A1* | 5/2012 | Elgort | G01N 24/08 324/307 |
| 2016/0055929 | A1* | 2/2016 | Zhan | H05H 3/04 250/251 |
| 2016/0198954 | A1* | 7/2016 | Wang | A61B 5/0095 600/407 |
| 2016/0202090 | A1* | 7/2016 | Cvijetic | G01S 17/66 356/614 |
| 2016/0202283 | A1* | 7/2016 | Wang | B64D 45/00 356/28 |

OTHER PUBLICATIONS

Lavery, M.P.J. et al., "Detection of a Spinning Object Using Light's Orbital Angular Momentum," Science, vol. 341, Aug. 2013. (pp. 537-540).

Lavery, M.P.J. et al., Measurement of the light orbital angular momentum spectrum using an optical geometric transformation, Journal of Optics, vol. 13, No. 6, Apr. 2011. (pp. 1-4).

Molina-Terriza, G. et al., "Probing canonical geometrical objects by digital spiral imaging," Journal of the European Optical Society, vol. 2, Apr. 2007. (pp. 1-6).

Torner, L. et al., "Digital spiral imaging," Optics Express, vol. 13, No. 3, Feb. 2005. (pp. 873-881).

Uribe-Patarroyo, N. et al., "Object Identification Using Correlated Orbital Angular Momentum States," Physical Review Letters, Jan. 2013. (pp. 1-5).

* cited by examiner

METHOD AND APPARATUS FOR REMOTE SENSING USING OPTICAL ORBITAL ANGULAR MOMENTUM (OAM)-BASED SPECTROSCOPY FOR OBJECT RECOGNITION

RELATED APPLICATION INFORMATION

This application claims priority to provisional application Ser. No. 62/074,778 filed on Nov. 4, 2014, incorporated herein by reference.

BACKGROUND

Technical Field

The present invention generally relates to methods and systems for remote sensing for object recognition. More particularly, the present disclosure is related to remote sensing using optical orbital angular momentum (OAM)-based spectroscopy for object recognition.

Description of Related Art

Remote sensing is the acquisition of information about an object or phenomenon without making physical contact with the object. In some instances, remote sensing enables collection of data in areas that may be dangerous or inaccessible. Accordingly, remote sensing is vital to an array of important scientific, environmental and social safety and security applications.

However, typical remote sensing methods fail to obtain high resolution spatial feature information about the object. For example, Light Detection and Ranging (LIDAR) is a remote sensing method in which light intensity is used to identify distance-based information to map the topography of an object/surface, its resolution is limited to the spot size of the light beam, which grows with increased distance. Consequently, remote sensing of high resolution features, such as small objects and sharp edges, is not possible using previous light-based remote sensing methods.

Remote sensing methods using non-OAM properties of the light beam (e.g., intensity, polarization, and wavelength) fail to obtain fine-resolution spatial information about the object, as discussed above. Orbital angular momentum of light (OAM) is the component of angular momentum of a light beam, such as the amount of rotation present in the light beam, that is dependent on the field spatial distribution, and not on the polarization (e.g., property of the wave which may oscillate in more than one orientation). Taking high resolution pixel-by-pixel images and/or videos of objects through, for example, low orbiting satellites, has also been proposed. However, in addition to requiring the capital expenditure (CAPEX) intensive acquisition and deployment of satellites, high resolution pixel-by-pixel images require large storage sizes and high bandwidth for image transmission, and can suffer from poor image quality and may require extensive and slow image post-processing.

The ability to overcome these limitations and perform high resolution object identification using LIDAR-based methods would, thus, be attractive to a range of important remote sensing applications.

SUMMARY

In one embodiment of the present principles, a transmitter using optical orbital angular momentum (OAM)-based spectroscopy for object recognition is provided. In an embodiment, the transmitter may include at least one OAM generator configured to apply at least one OAM state on a light beam to generate an optical OAM spectrum, and a light source modulator in accordance with the at least one OAM state for imaging a remote object.

In another embodiment of the present principles, a receiver for optical orbital angular momentum (OAM)-based spectroscopy is provided. In an embodiment, the receiver includes at least one OAM detector configured to receive a reflected optical OAM spectrum associated with a remote object, and a processor to receive the reflected optical OAM spectrum to provide a high resolution image of the remote object.

In yet another embodiment, a method for remote sensing using optical orbital angular momentum (OAM)-based spectroscopy for object recognition is provided. In an embodiment, the method may include applying at least one OAM state on a light beam to generate an optical OAM spectrum, transmitting the light beam on a remote object, receiving a reflected optical OAM spectrum associated with the remote object, and providing a high resolution image of the remote object based on the reflected optical OAM spectrum.

These and other features and advantages will become apparent from the following detailed description of illustrative embodiments thereof, which is to be read in connection with the accompanying drawings.

BRIEF DESCRIPTION OF DRAWINGS

The present principles will provide details in the following description of preferred embodiments with reference to the following figures wherein.

DETAILED DESCRIPTION OF PREFERRED EMBODIMENTS

In accordance with the present principles, systems and methods are provided for remote sensing using optical orbital angular momentum (OAM)-based spectroscopy for object recognition of a remote object. One of the main challenges in remote sensing applications is providing high resolution object identification using LIDAR-based methods. In one aspect, the methods, systems and computer program products disclosed herein employ optical orbital angular momentum (OAM) of a light beam to obtain high resolution feature identification of structural properties in LIDAR-based remote sensing. Advantageously, the instant methods and systems described herein provide effective compressive imaging (e.g., data compression) which is much more efficient than pixel-by-pixel imaging techniques, with the added advantage of having low cost and less complexity.

It should be understood that embodiments described herein may be entirely hardware, or may include both hardware and software elements which includes, but is not limited to, firmware, resident software, microcode, etc.

Figure 1:
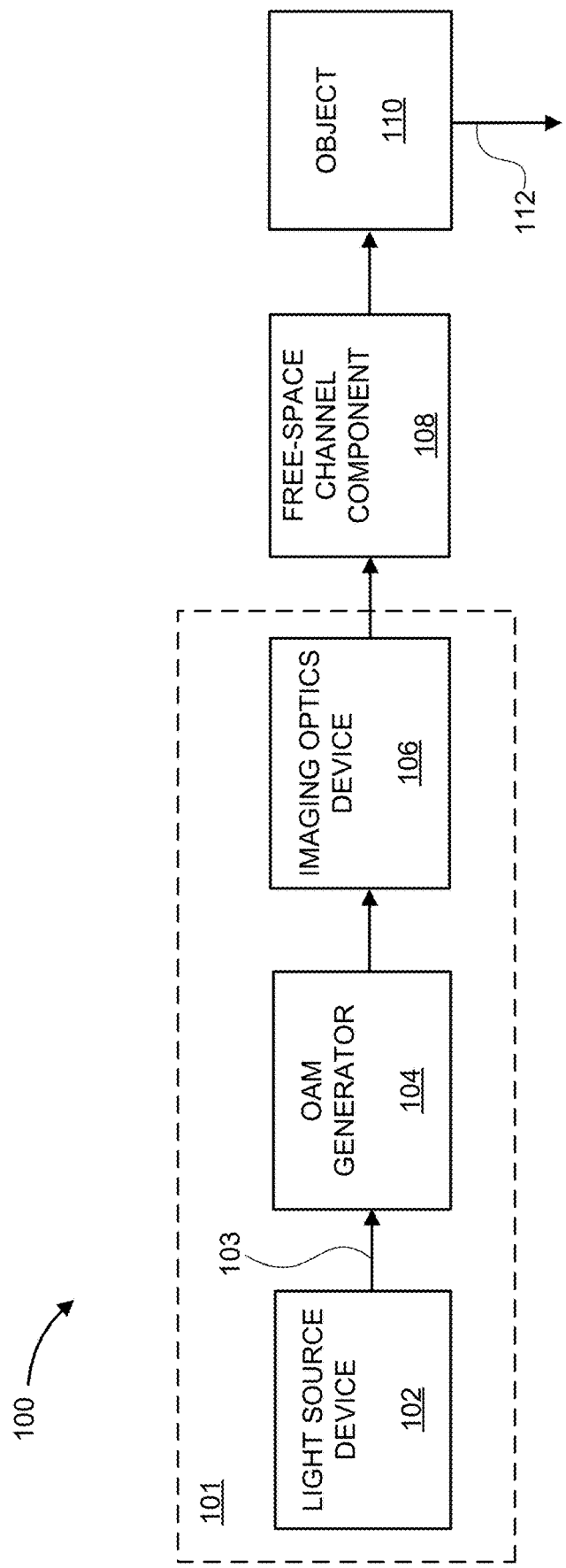
FIG. 1 shows an exemplary system for a transmitter-side remote sensing system using optical orbital angular momentum (OAM)-based spectroscopy for object recognition of a remote object, in accordance with an embodiment of the present principles.

Referring to the drawings in which like numerals represent the same or similar elements and initially to FIG. 1, a transmitter-side optical OAM-based remote sensing system 100 for object recognition with compressive imaging is illustratively depicted. In one embodiment, the transmitter-side optical OAM-based remote system 100 may include a transmitter 101. The transmitter 101 may include a light source modulator in accordance with at least one OAM state for imaging a remote object, such as at least one light source device 102, as will be described in further detail below. The light source device 102 may be configured to transmit a light beam 103 on a remote object 110. In some embodiments, the light source device 102 may include a laser beam source having a wavelength of 1550 nanometers, however other wavelengths are contemplated. For illustrative purposes, types of light source devices and/or laser beam sources may include, but are not limited to, vertical-cavity surface-emitting lasers (VCSELs), optical fiber laser, external cavity laser, solid state laser, high coherence light source, super-continuum light source, quantum cascade laser, etc.

The light beam 103 may intrinsically have angular momentum. Generally, angular momentum is the rotational direction of linear momentum and/or a measurement of the quantity of rotation about a particular linear axis. In paraxial approximation, which is an approximation used in Gaussian optics and ray tracing of light through an optical system (e.g., a lens), the light beam's 103 angular momentum may be separated into two parts, namely spin angular momentum and orbital angular momentum (OAM). The spin angular momentum of light is associated with light's polarization degree of freedom, such as a wave's circular or elliptical polarization. For example, an electromagnetic wave may have circular polarization when its electric and magnetic fields rotate continuously around the axis of the light beam during propagation. In contrast, the orbital angular momentum (OAM) of light is associated with light's spatial degree of freedom.

According to an embodiment of the present principles, the transmitter 101 of the transmitter-side optical OAM-based remote system 100 may include at least one optical OAM generator 104. The OAM generator 104 may configured to receive the light beam 103 from the light source device 102 and may generate at least one OAM state on the light beam 103 to generate an optical OAM spectrum 112. In an embodiment, the OAM generator 104 may apply OAM states on the light beam to generate an optical OAM spectrum 112 associated with the remote object 110, wherein the optical OAM spectrum 112 provides high resolution imaging information of the remote object 110, such as a high resolution image of the remote object 110.

For example, OAM states on light beams may include Bessel light beams, Laguerre-Gaussian light beams, optical fiber modes, superpositions of Bessel light beams or Laguerre-Gaussian light beams that have the same OAM phase number as described below. In particular, light's spatial modes with complex amplitude described by the phase factor $\exp(il\theta)$ are known as its OAM modes, where $l=0,\pm1,\pm2,\ldots$, and $\theta$ is the cylindrical coordinate. In one embodiment, the OAM generator 104 may apply arbitrary non-zero ($l\neq0$) OAM states on the light beam 103 of the light source 102, where $l$ denotes the OAM phase number and/or OAM state number. Light beams that carry non-zero OAM states may be defined as being in a helical mode, which may be characterized by a wave front including a helix shape with an optical vortex in the center at the beam axis. When the OAM state is zero (e.g., $l=0$), for example, the light beam does not bear OAM, and accordingly is not helical and has a constant phase across the mode. According to the present principles, both the zero (e.g., $l=0$) and non-zero (e.g., $l\neq0$) OAM modes and cases are supported.

In one embodiment, the optical OAM generator 104 may include a spatial light modulator (SLM), Q-phase plates, an OAM sorter, fiber-optic methods (e.g., generating an OAM mode in an optical fiber), integrated silicon photonics methods without loss of generality, etc. For example, a spatial light modulator (SLM) may include a device configured to impose spatially varying modulation on a beam of light, such as a modulation on the intensity and/or phase of a beam of light. In another example, Q-phase plates may include a liquid crystal cell having a thickness and/or birefringence selected to induce a birefringent phase at the wavelength for light propagation and may be employed to cause, for example, interaction between the spin angular momentum and orbital angular momentum.

In a further embodiment, the transmitter 101 may include at least one imaging optics device 106. In another embodiment, the transmitter-side optical OAM-based remote system 100 includes the at least one imaging optics device 106 such that the imaging optics device is separate and apart from the transmitter 101. For ease of illustration, the at least one imaging optics device 106 is shown as a part of the transmitter 101. As shown in FIG. 1, following the OAM generator 104, the light beam 103 may be applied as input to at least one imaging optics device 106, according to one embodiment. The at least one imaging optics device 106 may include, but is not limited to, a lens, a plurality of lenses arranged in a series, microscope objective(s), or free-space optics, etc., without loss of generality. For example, a microscope objective is an optical element, such as a single lens, mirror, similarly functioning devices or combinations thereof, that may gather light from the object being observed and may focus the light rays to produce a real image. In an embodiment, the at least one imaging optics device 106 may be configured to collimate the light beam to a fixed size, expand the light beam to a larger size, reduce the size of the light beam to a smaller size, or any combination thereof, image an object from a distance such that it is in focus to the detector, and/or image an object from an arbitrary distance such that it is in focus at the detector.

In an embodiment, the light beam 103 may be transmitted through a free-space channel component 108 (e.g., a first free-space channel component). The free-space channel component 108 may include, but is not limited to, air, outer space, a vacuum, or similarly functioning components. For example, the light beam 103 may be propagated in free space to transmit data (e.g., wirelessly), such as the case in telecommunications and/or computer networking. In another embodiment, the free-space channel component 108 may include, for example, optical amplifiers configured to send wavelengths of light directly through the atmosphere to another device waiting to receive the information.

As illustrated in FIG. 1, following transmission of the light beam 103 through a free-space channel component 108, the light beam 103, with OAM states, may be directed (e.g., shines) on a remote object of interest 110. Accordingly, a reflected optical OAM spectrum 112 associated with the remote object 110 may be generated and/or outputted. The OAM spectrum 112 is a parameter that may be used to characterize the light beam 103.

Figure 2:
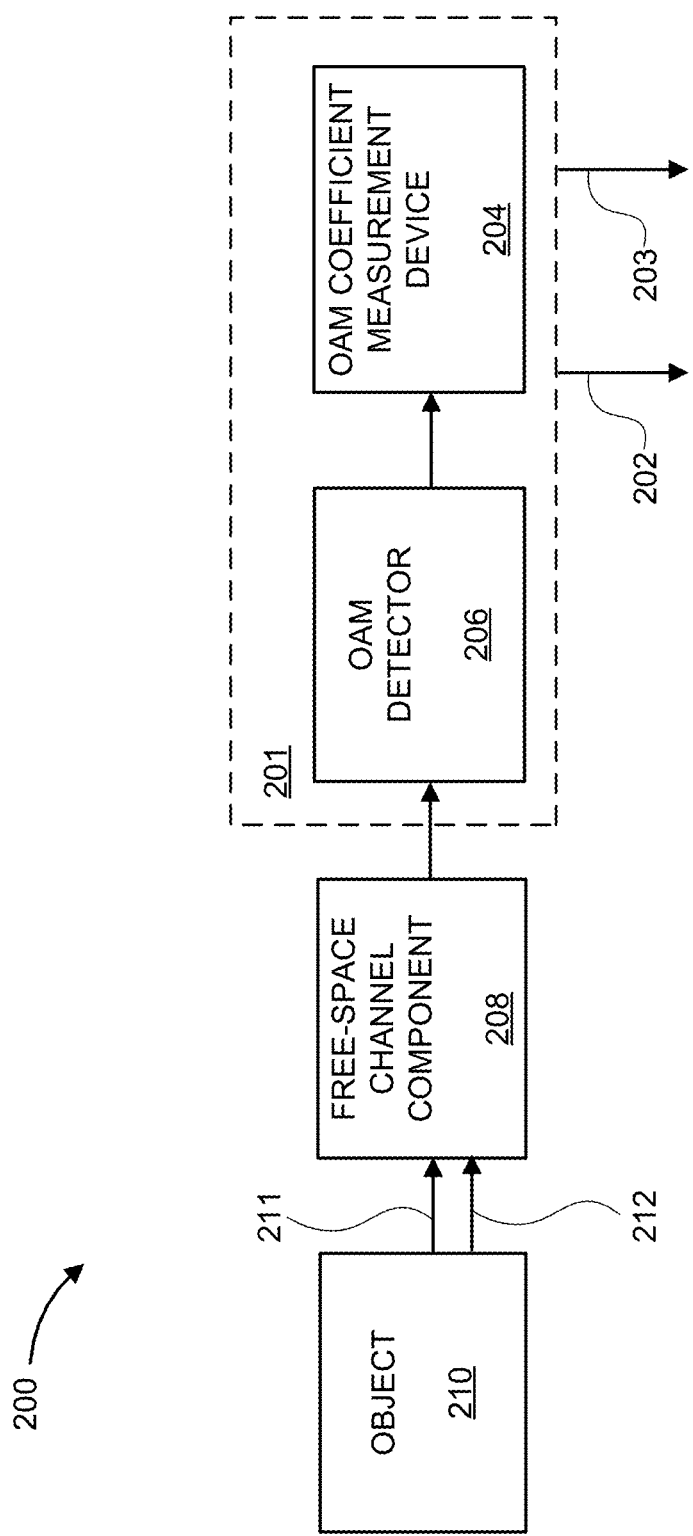
FIG. 2 shows an exemplary system for a receiver-side remote sensing system using optical orbital angular momentum (OAM)-based spectroscopy for object recognition of a remote object, in accordance with an embodiment of the present principles.

Now referring to FIG. 2, a receiver-side optical OAM-based remote sensing system 200 for remote sensing using optical orbital angular momentum (OAM)-based spectroscopy for object recognition of a remote object is illustratively depicted. It should be noted that the receiver-side optical OAM-based remote sensing system 200 and/or receiver 201 may be implemented in either transmissive or reflective modes. It should further be noted that remote object 210 may be the same remote object 110 depicted in FIG. 1, and OAM spectrum 212 may be the same or similar to the OAM spectrum 112 of FIG. 1.

For example, when the receiver-side optical OAM-based remote sensing system 200 of FIG. 2 is implemented in the reflective mode, the light beam 211 reflected from the remote object 210 travels back through the free-space channel 108 of FIG. 1 of the transmitter-side optical OAM-based remote sensing system 100 in the reverse direction. In such a scenario, the free-space channel component 208 in FIG. 2 may be identical to the free-space channel component 108 of FIG. 1. In an embodiment, when the receiver-side optical OAM-based remote sensing system 200 and/or receiver 201 of FIG. 2 is implemented in the reflective mode, the receiver-side components of the receiver 201, namely an OAM detector 206 and/or OAM coefficient measurement device 204 may also be collocated with the transmitter-side components of the transmitter 101 of FIG. 1, namely OAM generator 104 and imaging optics device 106. For example, the OAM generator 104 of FIG. 1 may be configured to provide the same or similar functions of the OAM detector 206 of FIG. 2. In addition, the OAM generator 104 of FIG. 1 may be configured to provide the same or similar functions of the OAM coefficient measurement device 204 of FIG. 2. In addition, further embodiments described herein below relating to the receiver 201 of FIG. 2 may be implemented in the transmitter 101 of FIG. 1. Accordingly, when the receiver-side optical OAM-based remote sensing system 200 and/or receiver 201 of FIG. 2 is implemented in the reflective mode, the receiver 201 may be the same as the transmitter 101 of FIG. 1. For ease of illustration, the embodiments of the OAM detector 206 and the OAM coefficient measurement device 204 will be described with reference to the receiver 201 implemented in the transmissive mode.

In another embodiment, the receiver-side optical OAM-based remote sensing system 200 and/or receiver 201 may be implemented in the transmissive mode. In the transmissive mode, the light beam 211 and/or optical OAM spectrum 212 reflected from the remote object 210, which carries the optical OAM spectrum information, may be transmitted through a second free-space channel component 208. In one embodiment, the second free-space channel 208 may be different from the free-space channel component 108 in the transmitter-side optical OAM-based remote sensing system 100 of FIG. 1. The second free-space channel 208 may include, for example, air, outer space, a vacuum, or similarly functioning components. In another embodiment, the free-space channel component 208 may include, for example, optical amplifiers configured to send wavelengths of light directly through the atmosphere to another device waiting to receive the information, such as the receiver 201.

In an embodiment, the receiver-side optical OAM-based remote sensing system 200 of FIG. 2 includes a receiver 201 configured to receive and/or measure the reflected light beam and/or reflected OAM spectrum 112 from FIG. 1. In a further embodiment, the receiver 201 may be configured to exploit the reflected OAM spectrum 112 for remote sensing, including providing high resolution spatial feature recognition and object identification. For example, the receiver 201 may be configured to provide a high resolution image of the remote object.

With continued reference to FIG. 2, following free-space channel transmission in the free-space channel component 208, the receiver 201 may be configured to receive the light beam 211 and/or the reflected optical OAM spectrum 212. In an embodiment, the receiver 201 may include at least one OAM detector 206, such that the OAM detector 206 may be employed to measure the reflected optical OAM spectrum 212. In another embodiment, the receiver 201 may include a processor to receive the reflected OAM spectrum 212 to provide a high resolution image of the remote object.

In an embodiment, the OAM detector 206 may be configured to measure a set of OAM modes associated with the remote object 210. OAM is one basis of spatial modes to describe light's spatial degree of freedom, which in contrast to other bases of spatial modes, such as the LP-modes of an optical fiber waveguide, is associated with an intrinsic property of light, such as its ability to possess a quantized value of OAM per photon. Aside from being able to obtain high resolution information about an object, OAM can also be transferred to atoms and molecules via absorption and emission selection rules, which may be exploited to gain additional information about the remote object 210, according to the present principles. In one embodiment, the OAM detector 206 and/or at least one OAM coefficient measurement device 204 may measure the reflected optical OAM spectrum 212 to provide high resolution object recognition 202 of the remote object 210, which will be described in further detail below.

In a further embodiment, the receiver-side optical OAM-based remote sensing system 200 and/or receive 201 may also include at least one OAM coefficient measurement device 204. The OAM coefficient measurement device 204 may be configured to determine and/or output coefficient values 203. In one embodiment, the at least one OAM coefficient measurement device 204 may be configured to extract OAM coefficient values 203 from the reflected optical OAM spectrum 212 measurement relating to at least one of the amplitude value and relative phase value of each OAM mode and/or amount of power present in each OAM mode. In another embodiment, the coefficient values 203 may include a measurement of the light power of each OAM mode that makes up an object image, a measurement of the light power of one OAM mode of interest, a simultaneous measurement of the light power of multiple OAM modes of interest, a filtering of all OAM modes except the OAM mode of interest such that the coefficient is then the light power of that OAM mode.

To describe the operation of the OAM detector 206 and the OAM coefficient measurement 204, it should be noted that OAM modes can be represented by Laguerre-Gaussian modes, such as solutions to Maxwell's scalar wave equation in cylindrical coordinates, given by the following equation:

$$LG_{\ell,p}(r,\theta) = \left(\frac{r\sqrt{2}}{w}\right)^{|\ell|} \exp\left(-\frac{r^2}{w^2}\right) L_p^{|\ell|}\left(\frac{2r^2}{w^2}\right) \exp(i\ell\theta) \quad (1)$$

where $(r,\theta)$ are cylindrical coordinates, w is the light beam's waist size, $L_p^{|\ell|}$ is the Laguerre polynomial for p=(0,1, 2, . . . ), p is the index of the r coordinate of (r,θ), and l is the index of the theta coordinate of (r,θ). Thus, p and l are indices that come from the solutions to the wave equation. Without loss of generality, the z-dependence (e.g., propagation) of Equation 1 has been suppressed for simplicity.

Similar to other basis of spatial modes, such as the LP-modes (e.g., modes of optical fibers with radially symmetric index profiles) of an optical fiber waveguide, OAM modes form a complete, orthogonal, and infinite dimensional basis. Therefore, an arbitrary light field, u(r,θ), such as the image of an object, may be mathematically represented as a superposition of OAM modes. This is referred to as an OAM spectrum, which, using a Laguerre-Gaussian mode representation of OAM modes, may be given by the equation:

$$u(r, \theta) = \sum_{p=0}^{p=+\infty} \sum_{\ell=-\infty}^{\ell=+\infty} a_{\ell,p} LG_{\ell,p}(r, \theta), \quad (2)$$

$$a_{\ell,p} = \frac{1}{\sqrt{2\pi}} \int_0^{2\pi} \int_0^r u(r, \theta)(LG_{\ell,p}(r, \theta))^* r dr d\theta, \quad (3)$$

$$\sum_{\ell=-\infty}^{\ell=+\infty} |a_{\ell,p}|^2 = 1, \quad (4)$$

where $a_{l,p}(r)$ are complex coefficients describing the amplitude and relative phase of each OAM mode in the superposition. In some embodiments, when ignoring the "p" index for simplicity, Equations (2), (3) and (4) may be rewritten as:

$$u(r, \theta) = \sum_{\ell=-\infty}^{\ell=+\infty} a_\ell(r) \exp(i\ell\theta), \quad (5)$$

$$a_\ell(r) = \frac{1}{\sqrt{2\pi}} \int_0^{2\pi} u(r, \theta) \exp(-i\ell\theta) d\theta, \quad (6)$$

$$\sum_{\ell=-\infty}^{\ell=+\infty} |a_\ell(r)|^2 = 1, \quad (7)$$

where $a_l(r) = \sum_{p=0}^{p=\infty} a_{l,p} L_p^{|l|}(2r^2/w^2)$ and the term $|a_l(r)|^2$ describes the amount of power in each OAM mode comprising u(r,θ). It should be noted that using the $|a_l(r)|^2$ information may be sufficient to discriminate between different remote objects, while measuring the full OAM mode spectrum, such as measuring the full set of complex coefficients, $a_l(r)$, enables full image reconstruction 202 of the remote object 210.

In an embodiment, the role of the OAM detector 206 and/or the OAM coefficient measurement device 204 of FIG. 2 is to obtain coefficient values 203, such as $a_l(r)$ and/or $|a_l(r)|^2$. In some embodiments, the OAM detector 206 and/or the OAM coefficient measurement device 204 may perform OAM spectroscopy in order to distinguish objects of distinct shapes via their OAM spectrum information. In some embodiments, the OAM detector 206 of FIG. 2 may be identical to the OAM generator 104 of FIG. 1 and may have various implementations.

Figure 3:
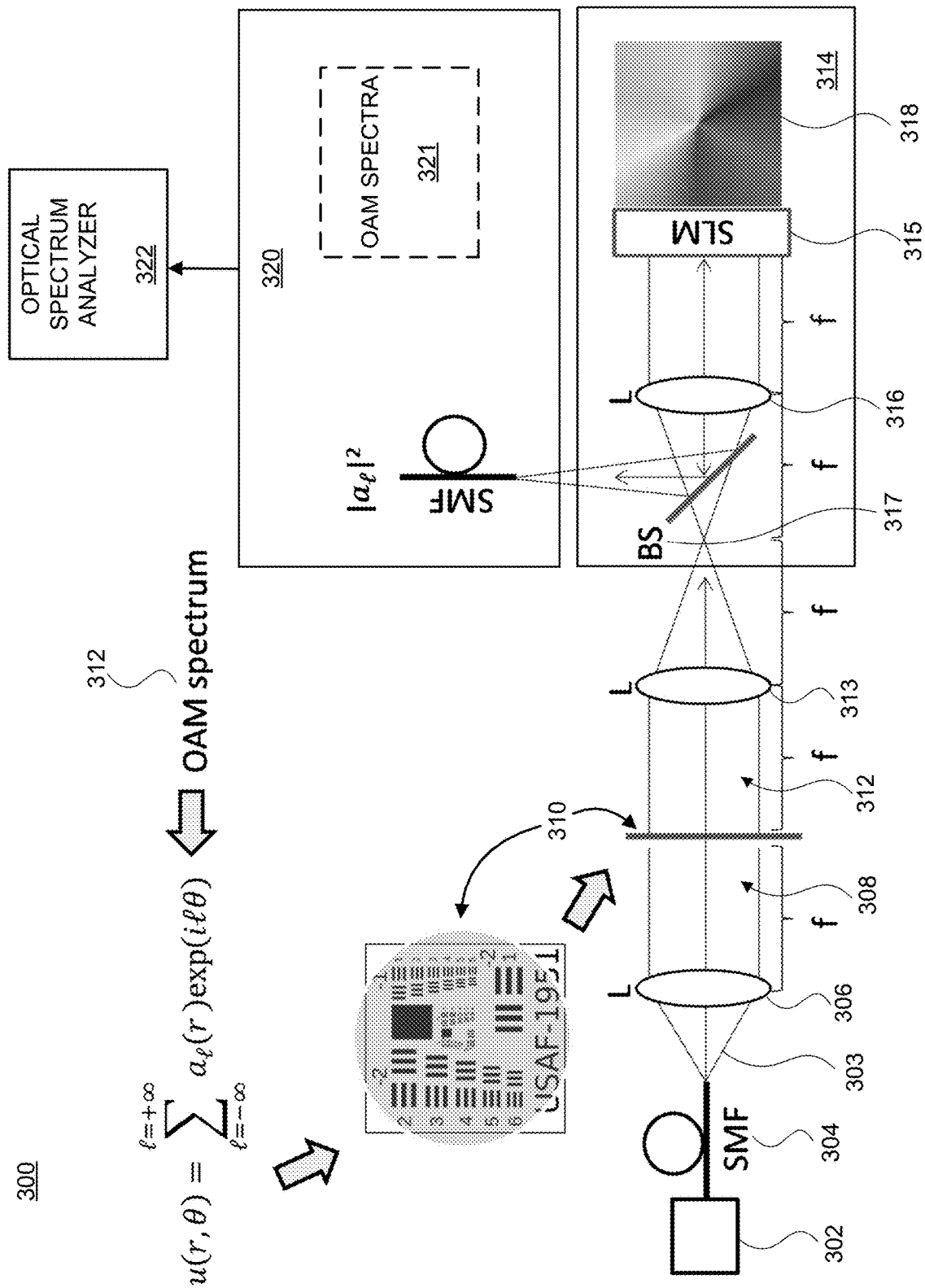
FIG. 3 shows an exemplary system for remote sensing using optical orbital angular momentum (OAM)-based spectroscopy for object recognition of a remote object, in accordance with an embodiment of the present principles.

Now referring to FIG. 3, an optical OAM-based remote sensing system 300 for OAM-based remote sensing for object recognition with compressive imaging is shown. In an embodiment, the optical OAM-based remote sensing system 300 may include the transmitter-side optical OAM-based remote sensing system 100 of FIG. 1 and/or the receiver-side optical OAM-based remote sensing system 200 of FIG. 2. As described above with reference to FIG. 2, some of the receiver-side components of the receiver-side optical OAM-based remote sensing system 200 may be collocated with the transmitter-side components of the transmitter-side optical OAM-based remote sensing system 100 of FIG. 1.

As illustrated in FIG. 3, the optical OAM-based remote sensing system 300 may include a light source device 302, an OAM generator 304, imaging optics 306, 313 (e.g., a lens), a first and second free-space channel components 308, 312, an OAM detector 314 and an OAM coefficient measurement device 320. It should be noted that the components of the optical OAM-based remote sensing system 300 of FIG. 3 correspond to the components of the transmitter-side OAM-based remote sensing system 100 of FIG. 1 and/or the receiver-side OAM-based remote sensing system 200 of FIG. 2. In one embodiment, the optical OAM-based remote sensing system 300 may be configured to perform OAM-based remote sensing on a remote object 310 to provide high resolution object recognition (e.g., a high resolution image) with compressive imaging.

In some embodiments, the OAM detector 314 may include a liquid crystal on silicon spatial light modulator (LCOS-SLM) 315. In a further embodiment, the OAM detector 314 may include a lens 316 and/or a beam splitter 317, which will be described in further detail below.

Since the OAM coefficients are complex numbers, they may also be written as a phasor given by $a_{l,p}(r) = \rho_{l,p} \exp(i\varphi_{l,p})$. A phasor is a complex number representing a sinusoidal function such that its amplitude, angular frequency, and initial phase do not depend explicitly on time. In some embodiments, to accurately reconstruct the full image of the remote object 310, OAM coefficients, including the phase value and amplitude value of $a_l$, may be measured by the OAM coefficient measurement device 320. However, in some embodiments, object identification may be possible without measuring, for example, the phase value. In one embodiment, to measure the reflected OAM spectrum of the image of the remote object 310, measurements for each coefficient, $a_l(r)$, of each OAM mode in the spectrum is obtained. Each coefficient may be measured by carrying out, for example, the integral of Equation (2). Equation (2) is an "overlap integral," such as the projection of an OAM mode, exp(ilθ), on each OAM mode in the spectrum of Equation (1). In some embodiments, this can be carried out by creating the phase of the OAM mode to be measured using, for example, a liquid crystal on silicon spatial light modulator (LCOS-SLM) 315 as the OAM detector 314. As described earlier, the LCOS-SLM 315 is a spatial light modulator (SLM) which may impose spatially varying modulation on a beam of light.

In a further embodiment, after creating the phase of the OAM mode to be measured, the at least one lens 316 may be used to calculate the Fourier transform, as shown in FIG. 3. The Fourier transform represents the frequency domain representation of the original signal, and in some embodiments may be used to decompose a function of a signal into the frequencies that constitute the signal. The amplitude value of each coefficient may be measured, for example, by coupling the first diffraction order into a single mode optical fiber (SMF) using the beam splitter 317. The SMF may then be received by the OAM coefficient device 320. In some embodiments, to measure the phase of each coefficient, a projective measurement of two OAM modes may also be made.

With continued reference to FIG. 3, the light source device 302 may emit a light beam 303 with a Gaussian mode using the OAM generator 304 with a single mode optical fiber (SMF). A single mode fiber is, for example, an optical fiber designed to carry light only directly down the fiber. Accordingly, in contrast to multi-mode fibers, a single mode fiber is more efficient at retaining the fidelity of the light beam and may have a higher bandwidth. As illustrated in FIG. 3, the light beam 303 may be expanded and collimated by two lenses, namely a first lens 306 and a second lens 313, thereby creating a good approximation to a plane wave which illuminates a target object 310 in the focal plane of the second lens 313.

As an illustrative example shown in FIG. 3, the remote object 310 comprises various number and lines. Using a 4f system, where f is the focal length of the lenses, the target object 310 may be imaged on to a LCOS-SLM 315 in the OAM detector 314. The LCOS-SLM 315 may be configured to receive the reflected optical OAM spectrum 312 and may display computer generated holograms (e.g., an optical phase distribution 318) of the reflected optical OAM spectrum 312 to make projective measurements of each coefficient's amplitude and/or phase in the OAM coefficient measurement device 320. For example, the LCOS-SLM 315 may display the inverse of an optical phase distribution of the reflected OAM spectrum 312 to measure the optical phase distribution 318 corresponding to the OAM mode.

In FIG. 3, the optical phase distribution 318 is the optical phase distribution of the reflected optical OAM spectrum 312 in a beam cross-section of an OAM mode. Accordingly, the OAM coefficient measurement device 320 may measure OAM spectra 321, including OAM coefficients, based on the optical phase distribution 318 of the reflected optical OAM spectrum 312, according to one embodiment. Based on the coefficient measurements determined by the OAM coefficient measurement device 320, which may identify high resolution features of the remote object, different objects and/or features of objects may be discriminated to provide high resolution object recognition (e.g., a high resolution image) of the remote object. For example, the optical OAM-based remote sensing system 300 may distinguish features of the remote object 310 with high resolution, including the number "5" versus the number "1", as shown in FIG. 3. Accordingly, the OAM coefficient measurement device 320 may measure various measurements of the reflected optical OAM spectrum 312 to identify the remote object 310 and its features smaller than the light beam.

Figure 4:
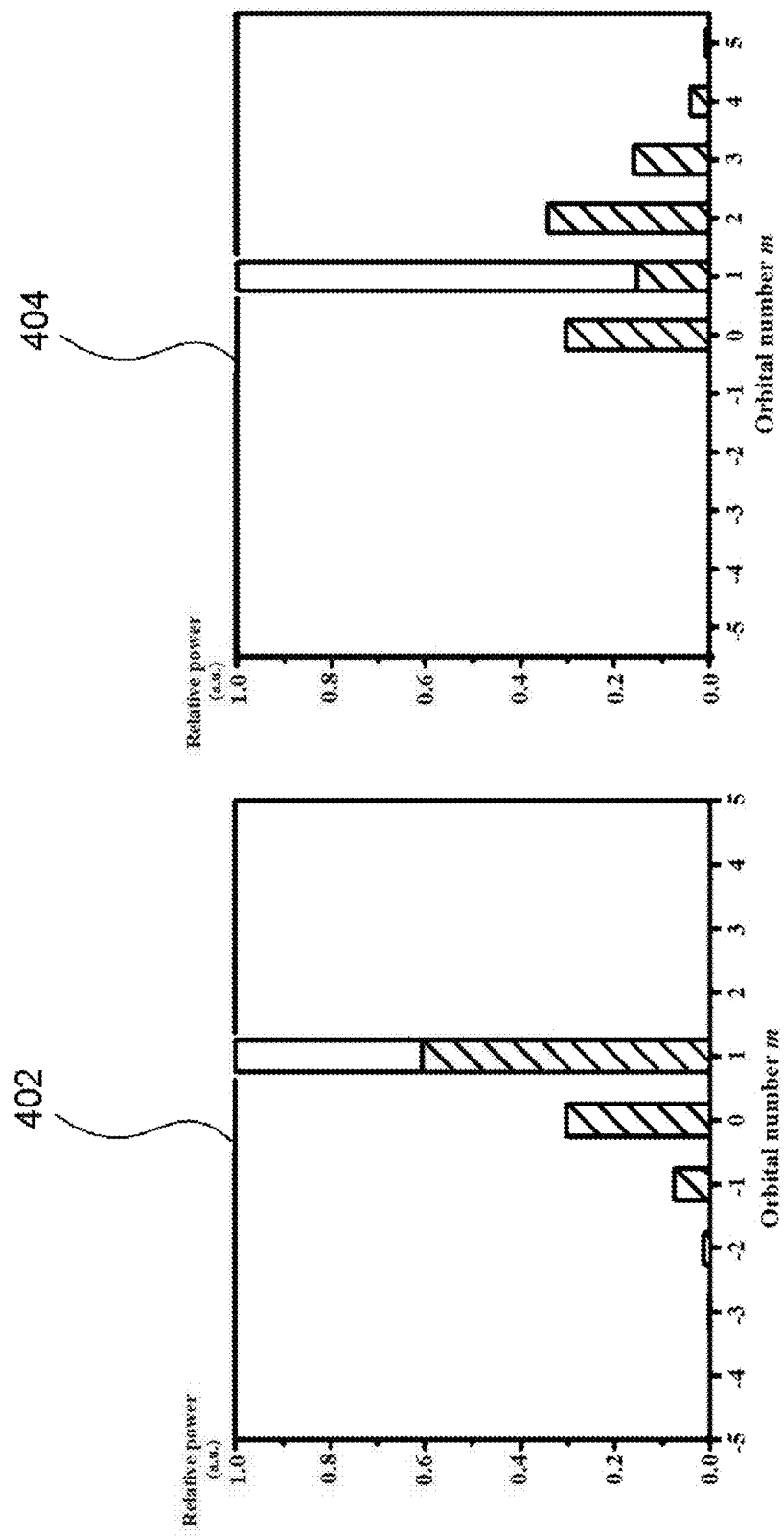
FIG. 4 is an exemplary OAM spectrum for features of a remote object, in accordance with an embodiment of the present principles.

Advantageously, in some embodiments, the optical OAM-based remote sensing system 300 may employ a light beam to measure the reflected optical OAM spectrum 312 of a remote object to distinguish high resolution features of the remote object without using a camera. Now referring to FIG. 4, with continued reference to FIG. 3, an example of OAM spectrums for various features of the remote object are illustratively depicted, in accordance with the present principles. For example, the remote object of FIG. 3 may be a chart used by an optometrist. The optical OAM-based remote sensing system 300 of FIG. 3 may be used to generate and receive a reflected optical OAM spectrum 312 for each feature of the remote object 310, such as the features labeled "5" and "1" on the remote object 310. As shown in FIG. 4, the methods and systems provided herein may measure the reflected optical OAM spectrums for each feature to distinguish the features and provide object recognition.

As shown in FIG. 4, a graph of the reflected optical OAM spectrum for each feature is illustratively depicted, where graph 402 represents the OAM spectrum for the number "5" and graph 404 represents the OAM spectrum for the number "1". As shown in FIG. 4, the OAM spectra (e.g., OAM measurements) for "5" and "1" are distinct. Accordingly, by measuring each feature's OAM spectra, the distinct features of the remote object may be recognized with high resolution to produce a high resolution image. In FIG. 4, the OAM spectrum 312 includes the relative power (e.g., y-axis), measured by intensity, such as watts, milliwatts, and/or arbitrary units (a.u.), etc., of each OAM mode (e.g., x-axis) that makes up the remote object. According to the present principles, the power of each OAM mode is the coefficient of that OAM mode. Advantageously, the OAM spectrum includes a number of measurements (e.g., OAM spectra), which is less than the number of pixels that a conventional camera would typically employ. Thus, because fewer measurements are measured than typically needed with conventional cameras, the present principles provide compressive imaging.

Referring back to FIG. 3, the output of the SMF of the OAM coefficient measurement device 320 may be connected to an optical spectrum analyzer 322, in accordance with one embodiment. By connecting the output of the OAM coefficient measurement device 320 to the optical spectrum analyzer 322, absorption or emission "selection rules" in light-matter interaction of atoms and/or molecules that depend on OAM may also be observed and/or measured. The optical spectrum analyzer 322 may include, but is not limited to, a spatial light modulator, integrated optics (e.g., ring resonators, an array of detectors, custom glass elements, holographic optical elements, wave front sensors, polarimeters, cameras, etc.). In one embodiment, the optical spectrum analyzer 322 may be configured to extract additional information from the OAM spectrum, including OAM-based measurements related to time, polarization, and wavelength of the light beam to provide multi-dimensional information about the object. The optical spectrum analyzer 322 may be configured to measure the OAM spectrum as a function of time, as a function of wavelength, and/or as a function of polarization. For example, the optical spectrum analyzer 322 may be configured to measure at least one of absorption selection rules and emission selection rules of the received light beam.

In some embodiments, the optical spectrum analyzer 322 may be a part of the receiver-side component, such as the receiver-side optical OAM-based remote sensing system 200 and/or receiver 201 of FIG. 2. In another embodiment, the optical spectrum analyzer 322 may be a separate component. For example, a prism or grating may be used to separate light's wavelengths spatially, then a spatial light modulator may be used to measure the OAM spectrum of each wavelength, and a polarization beam splitter may be used to separate the polarizations of light. Furthermore, a spatial light modulator may be used to measure the OAM spectrum of each polarization, and a time resolved detector may be used to measure the OAM spectrum of light at different discrete times.

Consequently, in some embodiments, multiple measurements related to light's spatial degree of freedom may be added to a remote sensing LIDAR system, such as the optical OAM-based remote sensing system 300. In addition, it should be noted that the OAM detector 314, as described in accordance with the present principles, may also enable jointly extracting and analyzing information from OAM-based measurements and time, polarization, and wavelength based measurements to provide multi-dimensional information about the remote object 310. Advantageously, other degrees of freedom inherent to the light beam may be exploited to gather additional information about the remote object in addition to the light arrival time at the detector, which can be used to measure distance information as described above, according to the present principles. For example, polarization of the light beam can be exploited to gather birefringence information about the object and glean insight about its macroscopic material composition properties. Moreover, wavelength-based information, as measured by the object's absorption/reflection of light at target wavelengths, can be useful in obtaining microscopic molecular-level information about the object.

The present principles also enables observing the absorption or emission "selection rules" in light-matter interaction of atoms and/or molecules that depend on OAM, such that multiple measurements related to light's spatial degree of freedom may be accounted for and available to a remote sensing LIDAR system. Advantageously, the system and methods disclosed here also enables jointly extracting and analyzing information from OAM-based measurements and time, polarization, and wavelength based measurements to provide multi-dimensional information about the object using the same remote sensing system.

It should be noted that in free-space channels with arbitrary transmission distances, such as free-space channel components 308 and 312, the OAM coefficient measurement device 320 may be affected by atmospheric turbulence and diffraction effects. Accordingly to the present principles, potential spectral aberrations from these effects may be corrected using known techniques, such as, for example, adaptive optics.

According to the present principles, the optical orbital angular momentum (OAM) of the light beam 303 generated by light source 302 may be employed for high resolution feature identification in LIDAR-based remote sensing, with the added benefit of compressive imaging which is much more efficient than pixel-by-pixel imaging techniques. Specifically, to measure spatial information of the remote object 310, the present principles rely on measuring the collected light's spatial degree of freedom. By shining the light beam on the remote object 310 and observing its output OAM spectrum using the OAM detector 314 and/or the OAM coefficient measurement device 320, high resolution structural properties, such as information relating to a small object's shape and sharp edges, can be imaged and identified, and may be used for remote object recognition without requiring the full pixel-by-pixel image of the object. Due to this ability to identify the object using the output optical OAM spectrum rather than the full pixel-by-pixel image, the proposed optical OAM-based remote sensing system 300 advantageously enables natural data compression, and thus provides both an object identification and a compressive imaging technique.

Advantageously, the systems and methods disclosed herein are more efficient both in terms of data storage and data transmission requirements compared to non-compressive high resolution object imaging methods. In addition, the present principles also require minimal post-processing compared to conventional high resolution image processing techniques. Compared to non-OAM LIDAR techniques, such as LIDAR using light's intensity, the present principles achieve higher spatial imaging resolution. In addition, compared to alternate optical spatial mode techniques (e.g., remote sensing using LP-modes), the present principles is superior in identifying rotational symmetries in objects and enables the generation and detection of a large number of spatial modes much more efficiently, enabling lower cost.

Quantum approach methods which exploit correlations of photons, entangled via their OAM, to analyze the spatial content of different objects is inefficient, since it is very difficult and expensive to generate and detect single photons, thereby making the quantum approach much more complex to implement. Moreover, exploitation of frequency shifts and detection of rotation of objects alone fail to provide analysis of structural spatial features and/or identification of high resolution features of objects.

Figure 5:
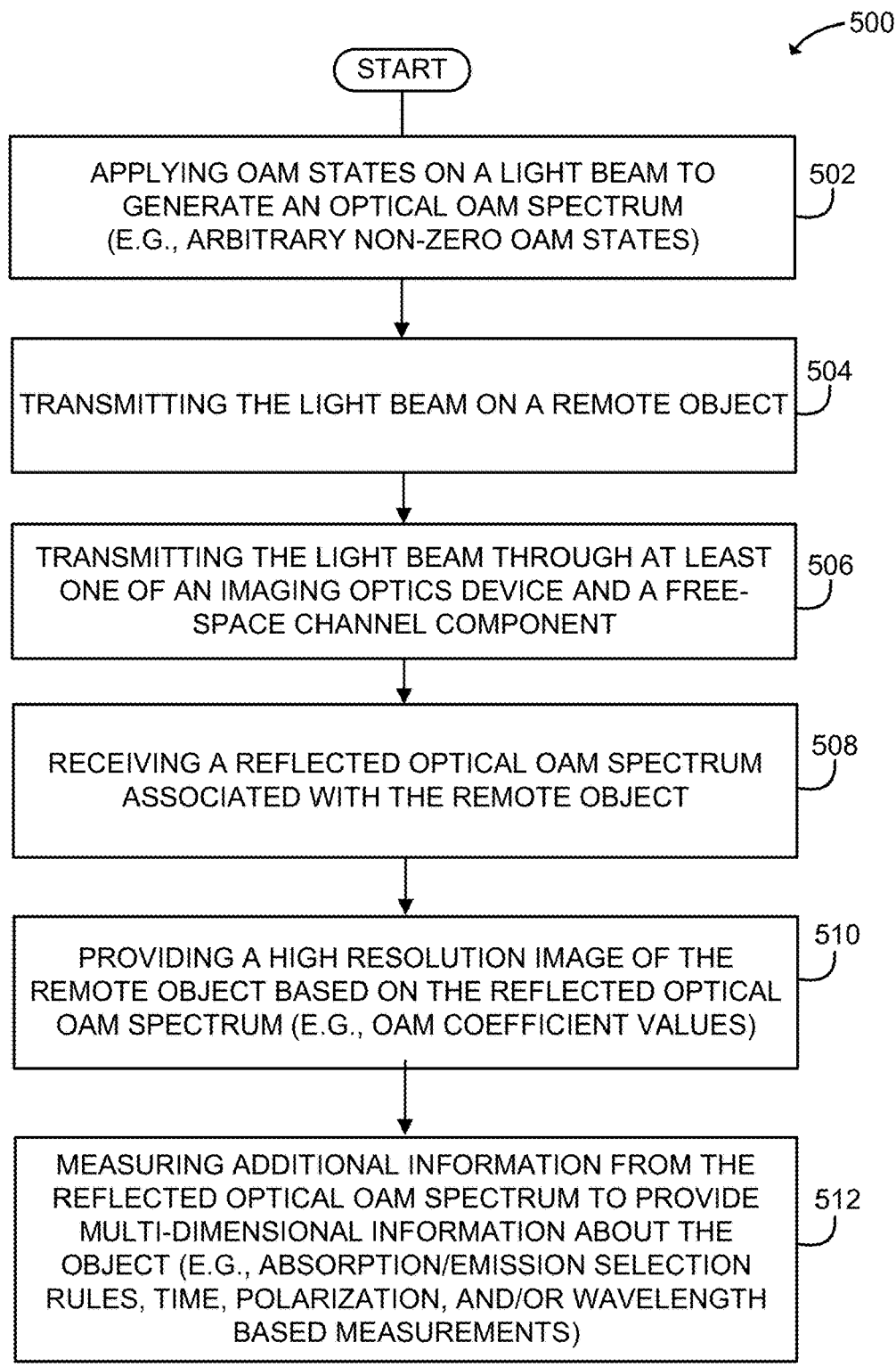
FIG. 5 is a block diagram illustratively depicting an exemplary method for remote sensing using optical orbital angular momentum (OAM)-based spectroscopy for object recognition of a remote object, in accordance with an embodiment of the present principles.

Now referring to FIG. 5, a method 500 for OAM-based remote sensing for object recognition with compressive imaging is illustratively depicted according to one embodiment of the present principles. Advantageously, the method 500 may employ optical orbital angular momentum (OAM) on a light beam to obtain high resolution feature identification in LIDAR-based remote sensing and to provide effective compressive imaging more efficient than pixel-by-pixel imaging techniques, with the added advantage of having low cost and less complexity. The method 500 can be performed, for example, by any of system 100 of FIG. 1, system 200 of FIG. 2, and/or system 300 of FIG. 3.

In block 502, arbitrary OAM states may be applied on a light beam before characterizing the remote object. In accordance with the present principles, the arbitrary OAM states may include non-zero OAM states.

In one embodiment, the light beam may be transmitted by, for example, a light source device according to various embodiments, and may be directed towards the remote object, as shown in block 504. The light beam may include a laser beam and may intrinsically have angular momentum.

After applying the OAM states on the light beam in block 502 and transmitting the light beam, the light beam may be optionally transmitted through at least one of an imaging optics device and/or free-space channel component, as illustrated in block 506. For example, the imaging optics device may include a lens, a plurality of lenses arranged in a series, etc.

In block 508, the light beam may be projected on the remote object to reflect an optical OAM spectrum, which may be associated with the remote object. The reflected optical OAM spectrum may provide high resolution imaging information of the remote object. The reflected optical OAM spectrum may be measured to provide a high resolution image of the remote object, as illustrated in block 510. For example, the OAM spectrum may be measured to extract OAM coefficient values for each OAM mode. In block 510, an image may be generated with high resolution structural properties of the remote object based on the extracted OAM coefficient values.

In block 512, the method 500 may also include measuring and/or extracting additional information from the OAM spectrum and/or received light beam, including OAM-based measurements and/or measurements related to time, polarization, wavelength, absorption selection rules, emission selection rules of the received light beam or a combination thereof to provide multi-dimensional information about the object.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

It should be noted that while the above configuration is illustratively depicted, it is contemplated that other sorts of configurations may also be employed according to the present principles. These and other variations between configurations are readily determined by one of ordinary skill in the art given the teachings of the present principles provided herein, while maintaining the present principles. Moreover, in one embodiment, at least one of the elements described above is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements are readily determined by one of ordinary skill in the art, given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A transmitter using optical orbital angular momentum (OAM)-based spectroscopy for object recognition, the transmitter comprising:
    at least one OAM generator configured to apply at least one OAM state on a single light beam to generate a single optical OAM spectrum configured to carry a compressed high resolution image of a remote object generated by compressive imaging, the at least one OAM state including a complex amplitude described by a phase factor $\exp(il\theta)$ with $\theta$ being a cylindrical coordinate, l being an integer, and i being an imaginary number; and
    a light source that can produce the light beam supporting the optical OAM spectrum for imaging the remote object.

2. The transmitter according to claim 1, wherein the at least one OAM state is an arbitrary non-zero OAM state.

3. The transmitter according to claim 1, wherein the at least one OAM generator includes at least one of a spatial light modulator, a liquid crystal on silicon spatial light modulator (LCOS-SLM), Q-phase plates, an OAM sorter or a combination thereof.

4. The transmitter according to claim 1, further comprising at least one imaging optics device, the at least one imaging optics devices including at least one of a lens, a plurality of lenses arranged in a series, a microscope objective, free-space optics, or a combination thereof.

5. The transmitter according to claim 1, wherein the at least one OAM generator is further configured to receive a reflected OAM spectrum to characterize the remote object.

6. The transmitter according to claim 5, further comprising an optical spectrum analyzer, the optical spectrum analyzer being configured to measure at least one of time, polarization, wavelength, absorption selection rules, emission selection rules of the received light beam or a combination thereof to provide multi-dimensional information about the remote object.

7. The transmitter according to claim 5, wherein the at least one OAM generator is further configured to measure the reflected optical OAM spectrum to provide a high resolution image of the remote object.

8. The transmitter according to claim 7, wherein the at least one OAM generator is further configured to measure a set of OAM modes associated with the reflected optical OAM spectrum of the remote object.

9. The transmitter according to claim 1, further comprising at least one OAM coefficient measurement device to extract OAM coefficient values from the optical OAM spectrum such that the OAM coefficient values provide a high resolution image of the remote object.

10. A receiver for optical orbital angular momentum (OAM)-based spectroscopy, the receiver comprising:
    at least one OAM detector configured to receive a single reflected optical OAM spectrum, generated by at least one OAM generator applying at least one OAM state on a single light beam, carrying a compressed high resolution image of a remote object generated by compressive imaging, the reflected optical OAM spectrum including a complex amplitude described by a phase factor $\exp(il\theta)$ with $\theta$ being a cylindrical coordinate, l, being an integer, and i being an imaginary number; and
    a processor to receive the reflected optical OAM spectrum to provide a high resolution image of the remote object from the reflected optical OAM spectrum carrying a compressed high resolution image of the remote object.

11. The receiver according to claim 10, wherein the at least one OAM detector includes at least one of a spatial light modulator, a liquid crystal on silicon spatial light modulator (LCOS-SLM), Q-phase plates, an OAM sorter or a combination thereof.

12. The receiver according to claim 10, further comprising at least one imaging optics device, the at least one imaging optics devices including at least one of a lens, a plurality of lenses arranged in a series, a microscope objective, free-space optics, or a combination thereof.

13. The receiver according to claim 10, further comprising an optical spectrum analyzer, the optical spectrum analyzer being configured to measure at least one of time, polarization, wavelength, absorption selection rules, emission selection rules of the reflected optical OAM spectrum or a combination thereof to provide multi-dimensional information about the remote object.

14. The receiver according to claim 10, wherein the at least one OAM detector is further configured to measure the reflected optical OAM spectrum to provide the high resolution image of the remote object.

15. The receiver according to claim 10, further comprising at least one OAM coefficient measurement device to extract OAM coefficient values from the reflected optical OAM spectrum such that the OAM coefficient values provide the high resolution image of the remote object.

16. The receiver according to claim 15, wherein the OAM coefficient values relate to at least one of an amplitude value and a relative phase value of each OAM mode.

\* \* \* \* \*